United States Patent
Yano et al.

(10) Patent No.: US 10,197,065 B2
(45) Date of Patent: Feb. 5, 2019

(54) CENTRIFUGAL COMPRESSOR, TURBOCHARGER PROVIDED WITH THE CENTRIFUGAL COMPRESSOR, AND METHOD FOR PRODUCING THE CENTRIFUGAL COMPRESSOR

(71) Applicant: MITSUBISHI HEAVY INDUSTRIES ENGINE & TURBOCHARGER, LTD., Sagamihara-shi, Kanagawa (JP)

(72) Inventors: Seigi Yano, Tokyo (JP); Noriyuki Hayashi, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 384 days.

(21) Appl. No.: 15/113,568

(22) PCT Filed: Feb. 26, 2014

(86) PCT No.: PCT/JP2014/054661
§ 371 (c)(1),
(2) Date: Jul. 22, 2016

(87) PCT Pub. No.: WO2015/128958
PCT Pub. Date: Sep. 3, 2015

(65) Prior Publication Data
US 2017/0009780 A1    Jan. 12, 2017

(51) Int. Cl.
*F02B 37/00* (2006.01)
*F02B 39/16* (2006.01)
(Continued)

(52) U.S. Cl.
CPC ............ *F04D 29/266* (2013.01); *F02B 37/00* (2013.01); *F02B 39/16* (2013.01);
(Continued)

(58) Field of Classification Search
CPC .. F04D 29/266; F04D 29/0513; F04D 29/284; F02B 37/00; F02B 39/16;
(Continued)

(56) References Cited

U.S. PATENT DOCUMENTS 3,612,719 A * 10/1971 Nomura ................. F01D 5/025
                                                                415/143
4,494,761 A    1/1985 Surace et al.

FOREIGN PATENT DOCUMENTS

JP       34-18312 Y1    11/1959
JP       48-15164 B1    5/1973
(Continued)

OTHER PUBLICATIONS

International Preliminary Report on Patentability and Written Opinion of the International Searching Authority (Forms PCT/IB/338, PCT/IB/373, PCT/IB/326 and PCT/ISA/237), dated Sep. 9, 2016, for International Application No. PCT/JP2014/054661, with an English translation of the Written Opinion.
(Continued)

*Primary Examiner* — Richard A Edgar
(74) *Attorney, Agent, or Firm* — Birch, Stewart, Kolasch & Birch, LLP (57) ABSTRACT

An object is to provide a centrifugal compressor in which an axial force applied from a shrink-fit impeller to a sleeve section is ensured even if the sleeve section is separated from a clamp surface in an axial direction of an attachment hole, as well as a turbocharger provided with the centrifugal compressor and a method of producing the centrifugal compressor. An inner peripheral surface of an attachment hole formed on a hub includes a clamp surface and a diameter-widening surface, and an outer peripheral surface of a sleeve section includes a diameter-reducing surface. The diameter-widening surface and the diameter-reducing surface respectively include an impeller-side contacting portion
(Continued)

and a sleeve-side contacting portion which contact each other, and a relationship represented by an expression θs<atan (d/L) is satisfied, where d is a length from an axis of the attachment hole to the sleeve-side contacting portion in a radial direction of the attachment hole, L is a length from the sleeve-side contacting portion to the clamp surface in the axial direction of the attachment hole, and θs is a sleeve inclination angle formed by an intersection of an axis of the sleeve section and a generatrix of a virtual cone which contacts the diameter-reducing surface at the sleeve-side contacting portion.

11 Claims, 5 Drawing Sheets

(51) Int. Cl.
  *F04D 29/26* (2006.01)
  *F04D 29/28* (2006.01)
  *F04D 29/051* (2006.01)

(52) U.S. Cl.
  CPC ....... *F04D 29/0513* (2013.01); *F04D 29/284* (2013.01); *F05D 2220/40* (2013.01); *F05D 2230/50* (2013.01); *F05D 2240/30* (2013.01); *F05D 2240/60* (2013.01); *F05D 2260/30* (2013.01); *F05D 2260/37* (2013.01); *F05D 2260/96* (2013.01); *Y02T 10/144* (2013.01)

(58) Field of Classification Search
  CPC ............. F05D 2220/40; F05D 2230/50; F05D 2240/30; F05D 2240/60; F05D 2260/30; F05D 2260/37; F05D 2260/96; Y02T 10/144
  See application file for complete search history.

(56) References Cited

FOREIGN PATENT DOCUMENTS

| | | |
|---|---|---|
| JP | 58-148299 U | 10/1983 |
| JP | 58-187620 A | 11/1983 |
| JP | 61-40879 A | 2/1986 |
| JP | 4432638 B2 | 3/2010 |
| JP | 2013-177852 A | 9/2013 |

OTHER PUBLICATIONS

International Search Report and English translation thereof (Forms PCT/ISA/220 and PCT/ISA/210), dated Mar. 25, 2014, for International Application No. PCT/JP2014/054661.

* cited by examiner

CENTRIFUGAL COMPRESSOR, TURBOCHARGER PROVIDED WITH THE CENTRIFUGAL COMPRESSOR, AND METHOD FOR PRODUCING THE CENTRIFUGAL COMPRESSOR

TECHNICAL FIELD

The present disclosure relates to a centrifugal compressor, a turbocharger provided with the centrifugal compressor, and a method for producing the centrifugal compressor.

BACKGROUND ART

As described in Patent Document 1, for instance, a compressor is provided with a thrust bearing for receiving a thrust force of a drive shaft (turbine shaft). A thrust bearing includes a collar (flange portion) to be fitted onto a drive shaft, and the collar is pressed against a stepped portion of the drive shaft at a predetermined axial force by an impeller (compressor impeller) via another collar (sleeve section) fitted onto the drive shaft.

As described in Patent Document 1, an impeller may be fixed to a drive shaft by shrink fitting. Shrink fitting is performed by inserting a drive shaft into an attachment hole of a heated impeller, whereby the impeller and the drive shaft come into close contact via an engagement portion (clamp surface) while the temperature of the impeller decreases. In Patent Document 1, the engagement portion between the drive shaft and the impeller is disposed on a back-face side of the impeller.

CITATION LIST

Patent Literature

Patent Document 1: JP4432638B

SUMMARY

Problems to be Solved

If an impeller is to be fixed to a drive shaft by shrink fitting, the impeller contracts while the temperature of the heated impeller decreases. During the contraction, a clamp surface of the impeller firstly contacts a shaft section of the drive shaft closely, and then the impeller further contracts in the axial direction of the attachment hole with the clamp surface in the center. Even if the impeller further contracts toward the clamp surface as described above, the sleeve section would not be separated from the impeller as long as the clamp surface and the sleeve section are adjoining to each other in the axial direction of the attachment hole.

However, for the sake of convenience of design, there may be a case in which the clamp surface is disposed away from the sleeve section in the axial direction of the attachment hole. In that case, if the impeller contracts with the clamp surface in the center, an axial force applied from the impeller to the sleeve section would decrease. With the axial force decreased, vibration may occur during operation of the compressor, and noise may be generated.

In view of this, an object of at least one embodiment of the present invention is to provide a centrifugal compressor in which an axial force applied from a shrink-fit impeller to a sleeve section is ensured even if the sleeve section is separated from a clamp surface in an axial direction of an attachment hole, as well as a turbocharger provided with the centrifugal compressor and a method of producing the centrifugal compressor.

Solution to the Problems

A centrifugal compressor according to at least one embodiment of the present invention comprises: a housing; an impeller disposed rotatably inside the housing and comprising a hub with an attachment hole and a plurality of blades integrally provided with the hub; a drive shaft comprising a shaft section extending inside the attachment hole of the impeller, a stepped section separated from the impeller, and a middle section disposed between the shaft section and the stepped section; a fastening member screwed to a distal end side of the shaft section; at least one flange portion fitted onto the middle section; a thrust member fixedly disposed relative to the housing and comprising a through hole through which the drive shaft is inserted and a thrust section which is disposed around the through hole and which contacts the flange portion; and a sleeve section fitted onto the middle section and disposed between the flange portion and the impeller. An inner peripheral surface of the attachment hole comprises a clamp surface which is in close contact with the shaft section by shrink fitting, and a diameter-widening surface with an inner diameter which increases with a distance from the clamp surface in an axial direction of the attachment hole. An outer peripheral surface of the sleeve section comprises a diameter-reducing surface with an outer diameter which reduces toward the clamp surface in the axial direction of the attachment hole. The diameter-widening surface and the diameter-reducing surface respectively comprise an impeller-side contacting portion and a sleeve-side contacting portion which contact each other. A relationship represented by an expression $\theta s < \operatorname{atan}(d/L)$ is satisfied, where d is a length from an axis of the attachment hole to the sleeve-side contacting portion in a radial direction of the attachment hole, L is a length from the sleeve-side contacting portion to the clamp surface in the axial direction of the attachment hole, and $\theta s$ is a sleeve inclination angle formed by an intersection of an axis of the sleeve section and a generatrix of a virtual cone which contacts the diameter-reducing surface at the sleeve-side contacting portion.

When the impeller is attached to the drive shaft by shrink fitting, the impeller contracts so that the clamp surface closely contacts the shaft section, and then the back surface side of the impeller contracts toward a contraction-center position. The direction of the sleeve-side contacting portion as seen from the contraction-center position can be represented by arc tangent of d/L. If the sleeve inclination angle $\theta s$ is equal to or larger than arc tangent of d/L, the diameter-widening surface of the impeller contracts so as to move away from the sleeve-side contacting portion, and an axial force applied from the impeller to the sleeve section decreases.

In contrast, in the configuration of the above described embodiment, arc tangent of d/L is larger than the sleeve inclination angle $\theta s$. Thus, the diameter-widening surface of the impeller further contracts so as to contact closely with the sleeve-side contacting portion, and thereby it is possible to increase an axial force applied from the impeller to the sleeve section. Accordingly, during operation of the centrifugal compressor, oscillation and noise generation are suppressed.

In some embodiments, the impeller comprises a first position-determining surface which is substantially orthogonal to the axis of the attachment hole, and one of the sleeve section or the drive shaft comprises a second position-determining surface which is substantially orthogonal to the axis of the attachment hole and which is contactable with the first position-determining surface during the shrink fitting.

If the diameter-widening surface is formed on the inner peripheral surface of the attachment hole, and the diameter-reducing surface is formed on the outer peripheral surface of the sleeve section, when the shaft section is inserted into the attachment hole of the impeller, the diameter-reducing surface may push out the diameter-widening surface and the insertion amount of the drive shaft with respect to the impeller may be greater than a design amount, depending on the conditions of insertion.

In this regard, with the configuration of the above described embodiment, if the shaft section is inserted into the attachment hole of the impeller, the first position-determining surface contacts the second position-determining surface, and thereby it is possible to prevent the insertion amount of the drive shaft with respect to the attachment hole of the impeller from being greater than a design amount.

In some embodiments, the sleeve inclination angle θs is 30° or more.

If the sleeve inclination angle θs is at least 30°, a sufficient axial force can be applied from the impeller-side contacting portion to the sleeve-side contacting portion in in the axial direction of the drive shaft.

In some embodiments, a difference between the atan (d/L) and the sleeve inclination angle θs is 20° or less.

If the difference between arc tangent of d/L and the sleeve inclination angle θs is 20° or less, when the back surface side of the impeller contracts, generation of an excessive contact pressure between the impeller-side contacting portion and the sleeve-side contacting portion is prevented. Accordingly, it is possible to prevent an excessive stress from being applied to the impeller and the sleeve section.

In some embodiments, the diameter-widening surface comprises a female tapered surface having constant inclination with respect to the axis of the attachment hole, and the diameter-reducing surface comprises a male tapered surface having constant inclination with respect to the axis of the attachment hole.

With this configuration, since the diameter-widening surface and the diameter-reducing surface respectively include a female tapered surface and a male tapered surface, they can be easily processed.

In some embodiments, the diameter-widening surface comprises a female tapered surface having constant inclination with respect to the axis of the attachment hole, and the diameter-reducing surface comprises a curved surface having varying inclination with respect to the axis of the attachment hole.

With this configuration, the diameter-widening surface includes a female tapered surface, the diameter-reducing surface includes a curved surface, and the sleeve-side contacting portion includes a part of the curved surface. Thus, it is possible to prevent a contact-surface pressure between the impeller-side contacting portion and the sleeve-side contacting portion from being locally high, which enables the impeller to contract smoothly. Accordingly, local application of stress to the impeller is prevented, and durability of the impeller improves.

In some embodiments, the diameter-widening surface comprises a curved surface having varying inclination with respect to the axis of the attachment hole, and the diameter-reducing surface comprises a male tapered surface having constant inclination with respect to the axis of the attachment hole.

With this configuration, the diameter-widening surface includes a curved surface, the diameter-reducing surface includes a male tapered surface, and the impeller-side contacting portion includes a part of the curved surface. Thus, it is possible to prevent a contact-surface pressure between the impeller-side contacting portion and the sleeve-side contacting portion from being locally high, which enables the impeller to contract smoothly. Accordingly, local application of stress to the impeller is prevented, and durability of the impeller improves.

A turbocharger according to at least one embodiment of the present invention comprises: the centrifugal compressor of any one of the above described configurations; and a turbine comprising a turbine blade fixed to the drive shaft.

With this configuration, an axial force applied from the impeller to the sleeve section utilizing contraction of the impeller is ensured for the centrifugal compressor, and thereby oscillation and noise generation are suppressed during operation of the turbocharger.

A method according to at least one embodiment of the present invention is of producing a centrifugal compressor comprising: a housing; an impeller disposed rotatably inside the housing and comprising a hub with an attachment hole and a plurality of blades integrally provided with the hub; a drive shaft comprising a shaft section extending inside the attachment hole of the impeller, a stepped section separated from the impeller, and a middle section disposed between the shaft section and the stepped section; a fastening member screwed to a distal end side of the shaft section; at least one flange portion fitted onto the middle section; a thrust member fixedly disposed relative to the housing and comprising a through hole through which the drive shaft is inserted and a thrust section which is disposed around the through hole and which contacts the flange portion; and a sleeve section fitted onto the middle section and disposed between the flange portion and the impeller, wherein an inner peripheral surface of the attachment hole comprises a clamp surface which is in close contact with the shaft section by shrink fitting, and a diameter-widening surface with an inner diameter which increases with a distance from the clamp surface in an axial direction of the attachment hole, wherein an outer peripheral surface of the sleeve section comprises a diameter-reducing surface with an outer diameter which reduces toward the clamp surface in the axial direction of the attachment hole, wherein the diameter-widening surface and the diameter-reducing surface respectively comprise an impeller-side contacting portion and a sleeve-side contacting portion which contact each other, and wherein a relationship represented by an expression θs<atan (d/L) is satisfied, where d is a length from an axis of the attachment hole to the sleeve-side contacting portion in a radial direction of the attachment hole, L is a length from the sleeve-side contacting portion to the clamp surface in the axial direction of the attachment hole, and θs is a sleeve inclination angle formed by an intersection of an axis of the sleeve section and a generatrix of a virtual cone which contacts the diameter-reducing surface at the sleeve-side contacting portion. The method comprises: a first inserting step of inserting the drive shaft into the through hole of the thrust member, the flange portion, and the sleeve section; a heating step of heating the impeller; a second inserting step of inserting the shaft section into the attachment hole of the impeller heated in the heating step, after the first inserting step; and a fastening step of screwing a fastening member to a distal end side of the shaft section, after the second inserting step.

With this configuration, after the second inserting step, the impeller contracts so that the clamp surface closely contacts the shaft section, and then the back surface side of the impeller contracts toward a contraction-center position. The direction of the sleeve-side contacting portion as seen from the contraction-center position can be represented by arc tangent of d/L. If the sleeve inclination angle θs is equal to or larger than arc tangent of d/L, the diameter-widening surface of the impeller contracts so as to move away from the sleeve-side contacting portion, and an axial force applied from the impeller to the sleeve section decreases.

In contrast, in the configuration of the above described embodiment, arc tangent of d/L is larger than the sleeve inclination angle θs. Thus, the diameter-widening surface of the impeller further contracts so as to contact the sleeve-side contacting portion closely, and thereby it is possible to increase an axial force applied from the impeller to the sleeve section. Accordingly, during operation of the centrifugal compressor, oscillation and noise generation are suppressed.

In some embodiments, the impeller comprises a first position-determining surface which is substantially orthogonal to the axis of the attachment hole, one of the sleeve section or the drive shaft comprises a second position-determining surface which is substantially orthogonal to an axis of the drive shaft, and the second inserting step comprises making the second position-determining surface contact the first position-determining surface.

If the diameter-widening surface is formed on the inner peripheral surface of the attachment hole, and the diameter-reducing surface is formed on the outer peripheral surface of the sleeve section, when the diameter-reducing surface is inserted into the diameter-widening surface, the diameter-reducing surface may push out the diameter-widening surface and the insertion amount of the drive shaft may be greater than a design amount.

In the configuration of the above described embodiment, the first position-determining surface is disposed on the impeller, and the second position-determining surface is disposed on one of the sleeve section or the drive shaft. The first position-determining surface and the second position-determining surface are orthogonal to the axis of the attachment hole and are contactable with each other, and with the first position-determining surface and the second position-determining surface contacting each other, it is possible to prevent the insertion amount of the drive shaft with respect to the attachment hole of the impeller from being greater than a design amount.

In some embodiments, the fastening step is performed after the heating step and before a temperature of the impeller decreases to an ambient temperature.

With this configuration, it is possible to produce the centrifugal compressor in large volume by performing the fastening step before the temperature of the impeller decreases to an ambient temperature.

Advantageous Effects

According to at least one embodiment of the present invention, it is possible to provide a centrifugal compressor in which an axial force applied from a shrink-fit impeller to a sleeve section is ensured even if the sleeve section is separated from a clamp surface in an axial direction of an insertion hole, as well as a turbocharger provided with the centrifugal compressor and a method of producing the centrifugal compressor.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention. For instance, an expression stating that something is along a direction includes not only being strictly parallel to the direction but also being inclined from the direction with tolerance or a certain angular degree, where needed. Further, an expression "substantially" means that description may include an error within a range of tolerance or modification that is normally performed.

Figure 1:
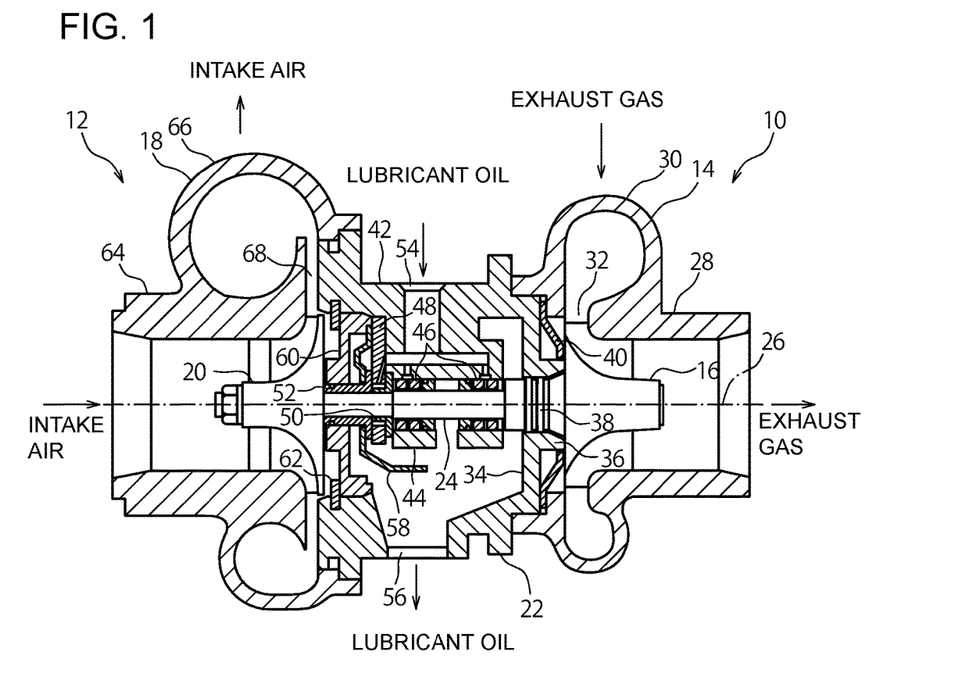
FIG. 1 is a vertical cross-sectional view schematically showing a turbocharger according to some embodiments of the present invention.

FIG. 1 is a vertical cross-sectional view schematically showing a turbocharger according to some embodiments of the present invention. A turbocharger is, for instance, applied to an internal combustion engine of a vehicle, a ship, or the like.

The turbocharger includes a turbine 10 and a compressor 12 of centrifugal type. The turbine 10 includes a turbine housing 14, a turbine blade (turbine impeller) 16 accommodated rotatably in the turbine housing 14, while the compressor 12 includes a compressor housing 18 and an impeller (compressor impeller) 20 accommodated rotatably in the compressor housing 18.

The turbine housing 14 and the compressor housing 18 are fixed to a bearing housing 22 via a non-depicted fastening member, and the turbine blade 16 of the turbine 10 and the impeller 20 of the compressor 12 are coupled to each other by a drive shaft (turbine rotor) 24 extending inside the bearing housing 22. Thus, the turbine blade 16, the impeller 20, and the drive shaft 24 are disposed on the same axis 26. The turbine blade 16 of the turbine 10 is rotated by exhaust gas discharged from the internal combustion engine, for instance, whereby the impeller 20 of the compressor 12 is rotated via the drive shaft 24. Rotation of the impeller 20 of the compressor 12 compresses intake air to be supplied to the internal combustion engine.

For instance, the turbine housing 14 includes a cylindrical (shroud) section 28 which accommodates the turbine blade 16, and a scroll section 30 surrounding the cylindrical section 28 at a part on the side of the bearing housing 22. The scroll section 30 has a non-depicted inlet of exhaust gas, and is in communication with the cylindrical section 28 via a throat portion 32. An opening of the cylindrical section 28 on the opposite side from the bearing housing 22 forms an outlet of exhaust gas.

To an opening of the turbine housing 14 on the side of the bearing housing 22, an end wall 34 of the bearing housing 22 is fitted and engaged. A seal portion 36 of a cylindrical shape is integrally and co-axially disposed on the end wall 34, and the seal portion 36 forms a seal hole penetrating through the center of the end wall 34. An end portion of the drive shaft 24 on the side of the turbine blade 16 is disposed inside the seal portion 36, and a seal ring 38 is disposed in a gap between the drive shaft 24 and the seal portion 36.

A back plate 40 of an annular shape is disposed in an annular recess between the end wall 34 and a back surface of the turbine blade 16. An outer circumferential portion of the back plate 40 is sandwiched by the turbine housing 14 and the bearing housing 22, and an inner circumferential portion of the back plate 40 surrounds the seal portion 36.

A bearing section 44 is disposed integrally with a peripheral wall 42 inside the bearing housing 22, and a bearing hole is formed on the bearing section 44. Two floating bushes 46, for instance, are disposed inside the bearing hole of the bearing section 44 to function as a radial bearing, and the center part of the drive shaft 24 is disposed inside the bearing hole of the bearing section 44 in a state of being inserted through the floating bushes 46.

A thrust member 48 of a plate shape orthogonal to an axis 26 is fixed to an end surface of the bearing section 44 on the side of the compressor 12, and the drive shaft 24 is inserted through a through hole of the thrust member 48. A thrust collar 50 and a thrust sleeve 52 are fitted onto the drive shaft 24, and the thrust member 48, the thrust collar 50, and the thrust sleeve 52 form a thrust bearing.

An oil feed port 54 and an oil drain port 56 are disposed on the peripheral wall 42 of the bearing housing 22, and an oil feed passage for feeding lubricant oil to bearing gaps of the radial bearing and the thrust bearing is formed through the bearing section 44 and the thrust member 48. Further, an oil deflector 58 is disposed so as to cover a face of the thrust member 48 on the side of the compressor 12 to prevent lubricant oil from scattering toward the compressor 12.

A lid member 60 with a seal hole in the center is fitted onto an opening of the bearing housing 22 on the side of the compressor 12, and the lid member 60 is fixed to the bearing housing 22 by a fixing ring 62. The thrust sleeve 52 is inserted through the seal hole of the lid member 60, and a non-depicted seal ring is disposed in a gap between the thrust sleeve 52 and the seal hole.

For instance, the compressor housing 18 includes a cylindrical (shroud) section 64 accommodating the impeller 20, and a scroll section 66 surrounding the cylindrical section 64 at a part on the side of the bearing housing 22. The scroll section 66 has a non-depicted outlet of air supply, and is in communication with the cylindrical section 64 via a diffuser section 68. An opening of the cylindrical section 64 on the opposite side from the bearing housing 22 forms an inlet of intake air.

Figure 2:
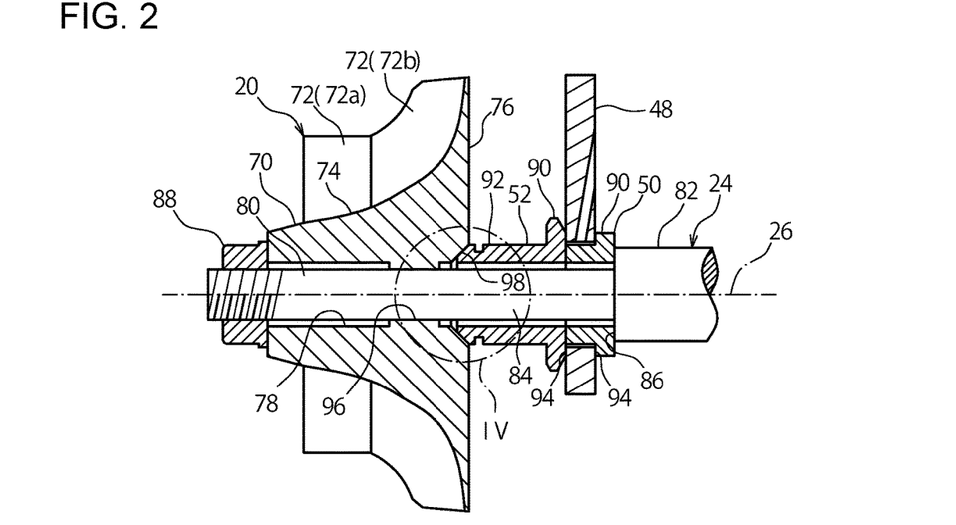
FIG. 2 is a view for describing a structure for fixing an impeller of a compressor to a drive shaft.

FIG. 2 is a view for describing a structure for fixing the impeller 20 of the compressor 12 to the drive shaft 24.

The impeller 20 includes a hub 70 and a plurality of blades 72. The hub 70 has a shape which is rotationally symmetric with respect to the axis 26. An end side of the hub 70 is disposed on the inlet side of intake air, and the other end side of the hub 70 is disposed on the side of the diffuser section 68, in a direction along the axis 26. An outer peripheral surface 74 of the hub 70 has a trumpet shape that widens toward the opposite end side, and the hub 70 has a back surface 76 that faces the lid member 60 on the opposite end side.

The hub 70 has an attachment hole 78 penetrating through the hub 70 along the axis 26, and the attachment hole 78 has openings on either side of the hub 70. A plurality of blades 72 is disposed integrally to the outer peripheral surface 74 of the hub 70, and is arranged at a predetermined interval in the circumferential direction of the hub 70. In some embodiments, the plurality of blades 72 includes full blades 72*a* and splitter blades 72*b* which are shorter than the full blades 72*a* in a direction along the axis 26, and the full blades 72*a* and the splitter blades 72*b* are disposed alternately in the circumferential direction.

The drive shaft 24 includes a shaft section 80, a large-diameter section 82, and a middle section 84, which are formed integrally with one another. The shaft section 80 extends inside the attachment hole 78 of the impeller 20, and the large-diameter section 82 is separated from the impeller 20. The middle section 84 is disposed between the shaft section 80 and the large-diameter section 82. The middle section 84 has a smaller diameter than the large-diameter section 82, and a stepped portion 86 is formed on the boundary between the middle section 84 and the large-diameter section 82.

A female screw is formed on a distal end side of the shaft section 80 disposed on one end side of the impeller 20, and a nut as a fastening member 88 is screwed onto the female screw. The fastening member 88 contacts the one end side of the impeller 20, and applies an axial force to the impeller 20 toward the stepped portion 86 in a direction along the axis 26.

At least one flange portion 90 is fitted onto the middle section 84 of the drive shaft 24. In some embodiments, each of the thrust collar 50 and the thrust sleeve 52 fitted onto the middle section 84 in series has a flange portion 90.

Further, the thrust sleeve 52 includes a sleeve section 92 fitted onto the middle section 84, and the sleeve section 92 is disposed between the flange portion 90 and the impeller 20.

The middle section 84 is inserted through a through hole of the thrust member 48, and the thrust member 48 has a thrust portion 94 which is disposed around the through hole and which faces and contacts the flange portion 90 in a direction along the axis 26. In some embodiments, the thrust member 48 includes the thrust portion 94 on each of the opposite sides in a direction along the axis 26.

An inner peripheral surface of the attachment hole 78 includes a clamp surface 96 and a diameter-widening surface 98. The clamp surface 96 is in close contact with the shaft section 80 by shrink fitting. Specifically, the attachment hole 78 of the hub 70 has a region with a smaller diameter formed partially in a direction along the axis 26, and thereby the inner peripheral surface of the region forms the clamp surface 96. In some embodiments, the outer diameter of the shaft section 80 is partially enlarged in a region in a direction along the axis 26, and thereby a region of the attachment hole 78 facing the region with an enlarged diameter forms a clamp surface.

Figure 3:
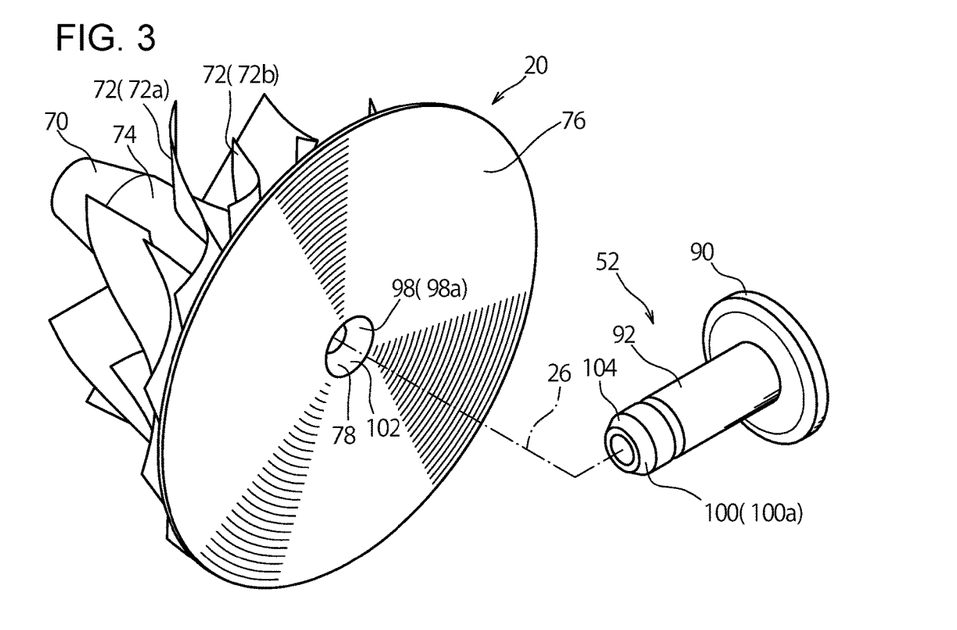
FIG. 3 is a schematic perspective view of an impeller and a thrust sleeve.
Figure 4:
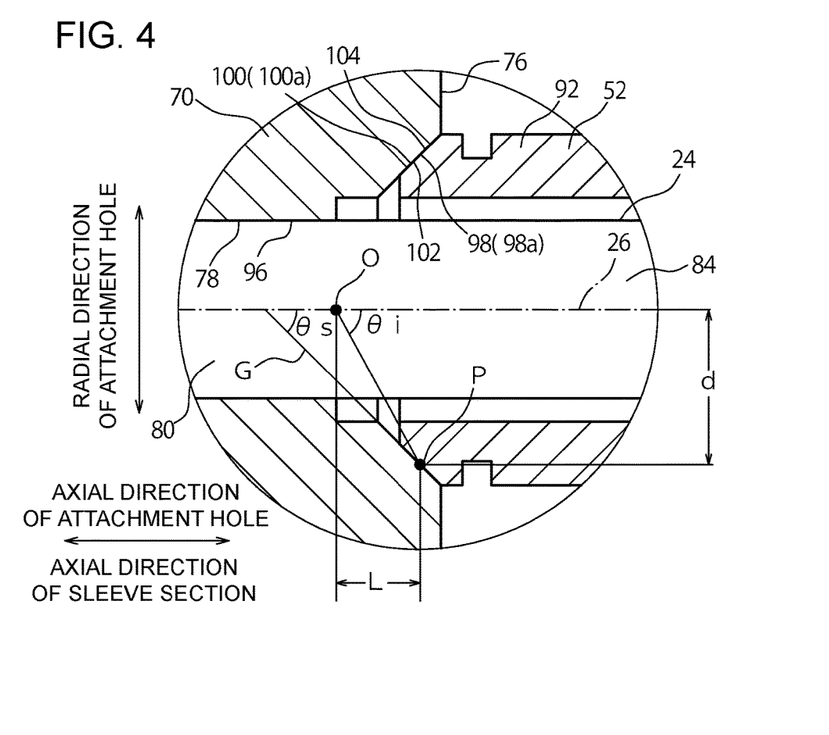
FIG. 4 is an enlarged view of region IV in FIG. 2.

FIG. 3 is a schematic perspective view of the impeller 20 and the thrust sleeve 52. FIG. 4 is an enlarged view of region IV in FIG. 2.

As depicted in FIGS. 2 and 3, the diameter-widening surface 98 has an inner diameter that increases with a distance from the clamp surface 96 at the side of the thrust sleeve 52 from the clamp surface 96, in a direction along the axis 26, which is an axial direction of the attachment hole 78. In some embodiments, the diameter-widening surface 98 includes a female tapered surface 98a.

In accordance with the diameter-widening surface 98, the outer peripheral surface of the sleeve section 92 of the thrust sleeve 52 has a diameter-reducing surface 100 with an outer diameter reducing toward the clamp surface 96 in the axial direction of the attachment hole 78, on the side of the impeller 20. In some embodiments, the diameter-reducing surface 100 includes a male tapered surface 100a.

The diameter-widening surface 98 and the diameter-reducing surface 100 respectively include an impeller-side contacting portion 102 and a sleeve-side contacting portion 104 which contact each other.

Herein, the following expression is satisfied:

$$\theta s < \mathrm{atan}(d/L) \quad (1)$$

where d is the length between the axis of the attachment hole 78 and the sleeve-side contacting portion 104 in a radial direction of the attachment hole 78, L is the length between the clamp surface and the sleeve-side contacting portion 104 in the axial direction of the attachment hole 78, and θs is a sleeve inclination angle at which the axis 26, which is an axis of the sleeve section 92, intersects with a generatrix G of a virtual cone that contacts the diameter-reducing surface 100 at the sleeve-side contacting portion 104. In the expression (1), "atan" represents arc tangent.

In some embodiments, the impeller-side contacting portion 102 and the sleeve-side contacting portion 104 are formed by surfaces (contact surfaces), and in this case, point P of the sleeve-side contacting portion 104, which is the base point of the lengths d and L, is at the center of the contact surface in the radial direction and the axial direction of the attachment hole 78.

Figure 5:
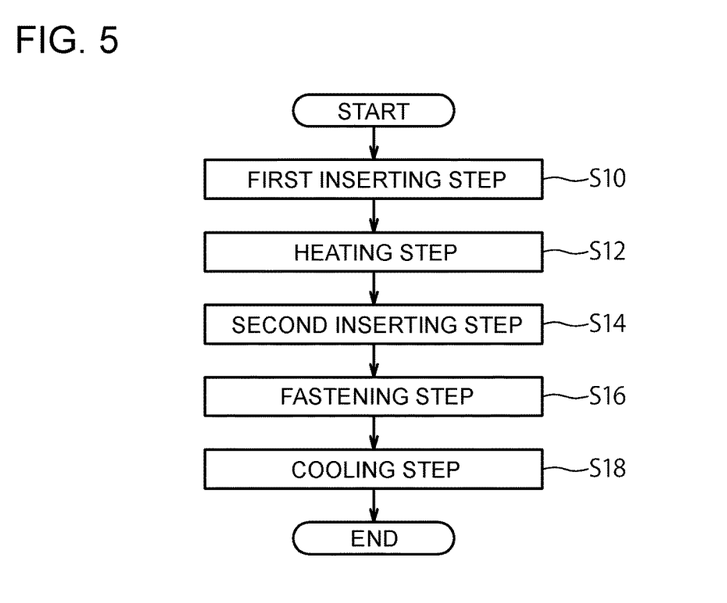
FIG. 5 is a flowchart schematically showing a process of a method of fixing an impeller to a drive shaft, which is part of a method of producing a compressor according to some embodiments.

FIG. 5 is a flowchart schematically showing a process of a method of fixing the impeller 20 to the drive shaft 24, which is part of a method of producing the compressor 12 described above.

The method of fixing the impeller 20 includes the first inserting step S10, a heating step S12, the second inserting step S14, a fastening step S16 and a cooling step S18.

In the first inserting step S10, the drive shaft 24 is inserted into the through hole of the thrust member 48, the flange portion 90, the sleeve section 92, and the like. Specifically, the drive shaft 24 is inserted into members which should be fitted before the impeller 20 is fixed to the drive shaft 24.

In the heating step S12, the impeller 20 is heated to a predetermined temperature. Accordingly, the impeller 20 undergoes thermal expansion and the inner diameter of the attachment hole 78 increases.

The second inserting step S14 is performed after the first inserting step S10. In the second inserting step S14, the shaft section 80 is inserted into the attachment hole 78 of the impeller 20 heated in the heating step S12.

The fastening step S16 is performed after the second inserting step S14. In the fastening step S16, a fastening member 88 is screwed to the distal end side of the shaft section 80. By screwing the fastening member 88, an axial force in a direction toward the stepped portion 86 is applied to the impeller 20.

The cooling step S18 is performed after the second inserting step S14. In the cooling step S18, the impeller 20 is forcedly cooled or naturally cooled to an ambient temperature. The inner diameter of the attachment hole 78 contracts while the impeller 20 is being cooled, and the clamp surface 96 closely contacts the shaft section 80. Accordingly, the impeller 20 is fixed to the drive shaft 24.

According to the compressor 12 and the method of producing the compressor 12 described above, when the impeller 20 is attached to the drive shaft 24 by shrink fitting, the impeller 20 contracts so that the clamp surface 96 closely contacts the shaft section 80, and then the back surface 76 side of the impeller 20 contracts toward a contraction-center position O (see FIG. 4). The direction of the sleeve-side contacting portion 104 (point P) as seen from the contraction-center position O, which is an angle of direction based on the axis 26 (hereinafter, also referred to as an impeller inclination angle θi), can be represented by arc tangent of d/L.

Now, if the sleeve inclination angle θs is equal to or larger than arc tangent of d/L, which is the impeller inclination angle θi, the diameter-widening surface 98 of the impeller 20 contracts so as to move away from the sleeve-side contacting portion 104, and an axial force applied from the impeller 20 to the sleeve section 92 decreases.

Thus, in the above described compressor 12, arc tangent of d/L, i.e., the impeller inclination angle θi, is set to be greater than the sleeve inclination angle θs. With this setting, after the close contact of the clamp surface 96, the diameter-widening surface 98 of the impeller 20 further contracts so as to contact closely the sleeve-side contacting portion 104, and thereby it is possible to increase an axial force applied from the impeller 20 to the sleeve section 92.

In some embodiments, the diameter-widening surface 98 includes a female tapered surface 98a with constant inclination with respect to the axis of the attachment hole 78, while the diameter-reducing surface 100 includes a male tapered surface with constant inclination with respect to the axis of the attachment hole 78. With this configuration, since the diameter-widening surface 98 and the diameter-reducing surface 100 include a tapered surface, they can be easily processed.

In some embodiments, the female tapered surface 98a and the male tapered surface 100a have a tapered angle, i.e., the sleeve inclination angle θs set to 45°, and the length d is longer than the length L. With this configuration, it is possible to satisfy the above expression (1) with simple configuration. Specifically, if the change amount (contraction amount) Δd of the length d is larger than the change amount (contraction amount) ΔL of the length L, and the sleeve inclination angle θs is 45°, the impeller-side contacting portion 102 does not move away from the sleeve-side contacting portion 104 even after cooling of the impeller 20.

Figure 6:
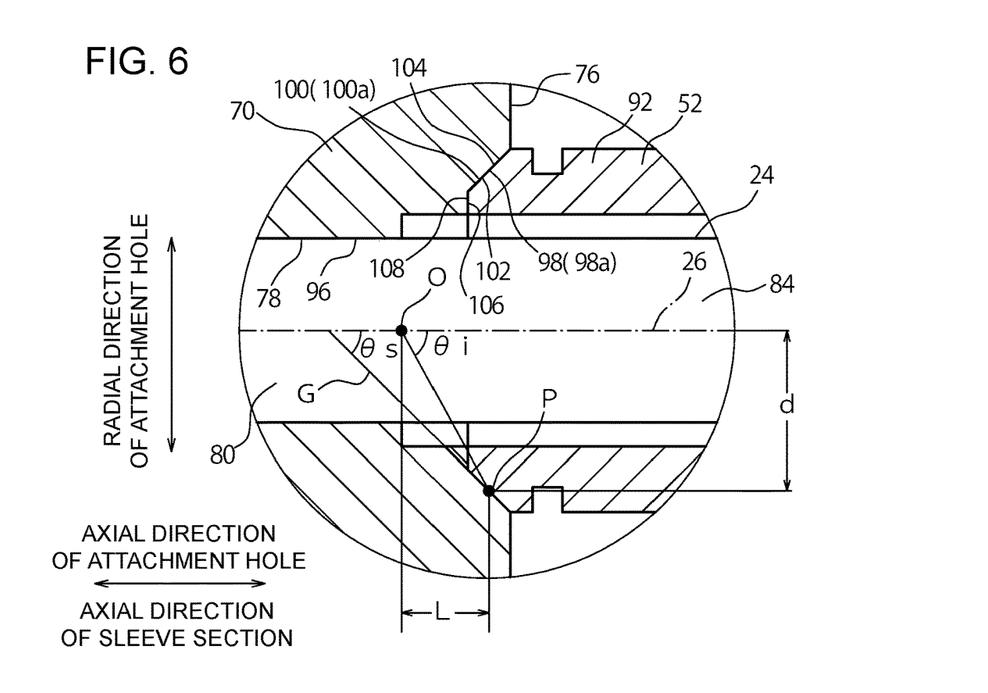
FIG. 6 is an enlarged view of a compressor according to some embodiments, corresponding to FIG. 4.

FIG. 6 is an enlarged view of the compressor 12 according to some embodiments, corresponding to FIG. 4.

In some embodiments, as depicted in FIG. 6, the impeller 20 includes the first position-determining surface 106 substantially orthogonal to the axis of the attachment hole 78, and the sleeve section 92 includes the second position-determining surface 108 substantially orthogonal to the axis of the attachment hole 78 and contactable with the first position-determining surface 106 during shrink fitting.

If the diameter-widening surface 98 is formed on the inner peripheral surface of the attachment hole 78, and the diameter-reducing surface 100 is formed on the outer peripheral surface of the sleeve section 92, when the shaft section 80 of the drive shaft 24 is inserted into the attachment hole 78 of the impeller 20 in the second inserting step S14, the diameter-reducing surface 100 may push out the diameter-widening surface 98 and the insertion amount of the drive shaft 24 with respect to the impeller 20 may be greater than a design amount, depending on the conditions of insertion.

In this regard, with the configuration of the above described embodiment, if the shaft section 80 is inserted into the attachment hole 78 of the impeller 20, the first position-determining surface 106 contacts the second position-determining surface 108, and thereby it is possible to prevent the insertion amount of the drive shaft 24 with respect to the attachment hole 78 of the impeller 20 from being greater than a design amount.

In some embodiments, as depicted in FIG. 6, the first position-determining surface 106 of an annular shape is formed inside the attachment hole 78, and the second position-determining surface 108 of an annular shape is formed on a distal end of the sleeve section 92. The first position-determining surface 106 is joined to a smaller diameter end of the diameter-widening surface 98, and the second position-determining surface 108 is joined to a smaller diameter end of the diameter-reducing surface 100. With this configuration, it is possible to provide the first position-determining surface 106 and the second position-determining surface 108 with simple configuration.

Figure 7:
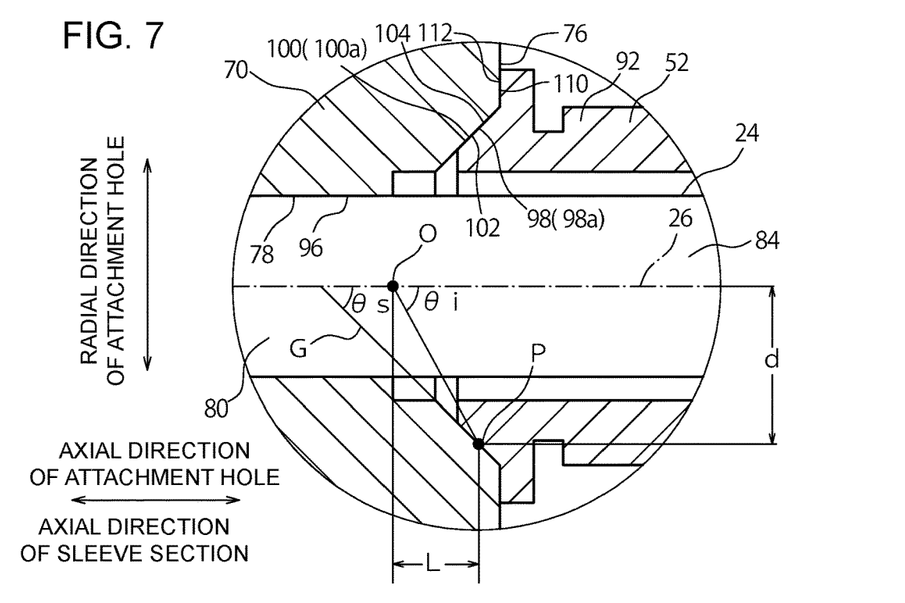
FIG. 7 is an enlarged view of a compressor according to some embodiments, corresponding to FIG. 4.

FIG. 7 is an enlarged view of the compressor 12 according to some embodiments, corresponding to FIG. 4.

In some embodiments, as depicted in FIG. 7, the first position-determining surface 110 of an annular shape is formed on a part of the back surface 76 of the impeller 20, and the second position-determining surface 112 of an annular shape is formed on a flange portion protruding outward in the radial direction from the sleeve section 92. The first position-determining surface 110 is joined to a larger diameter end of the diameter-widening surface 98, and the second position-determining surface 112 is joined to a larger diameter end of the diameter-reducing surface 100. With this configuration, it is possible to provide the first position-determining surface 110 and the second position-determining surface 112 with simple configuration.

Figure 8:
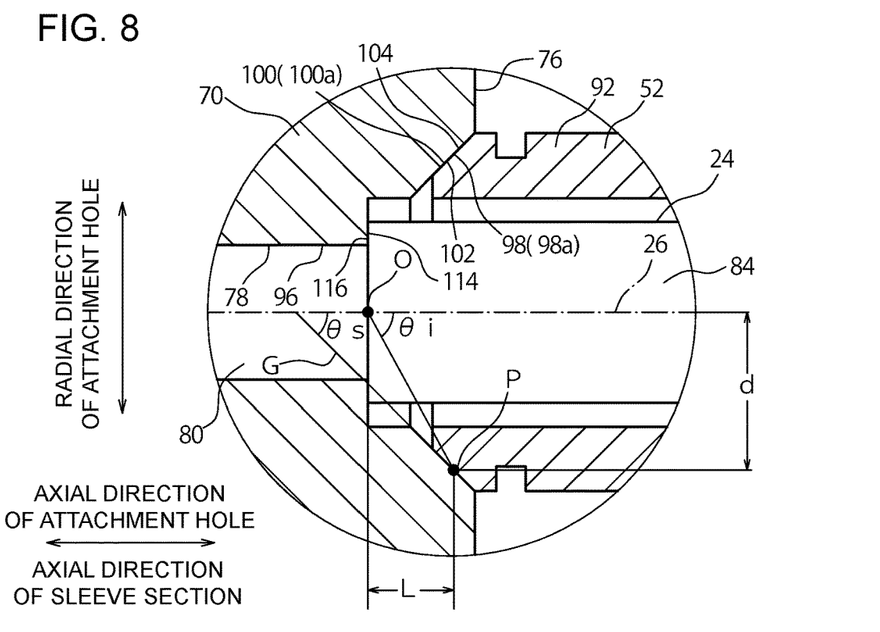
FIG. 8 is an enlarged view of a compressor according to some embodiments, corresponding to FIG. 4.

FIG. 8 is an enlarged view of the compressor 12 according to some embodiments, corresponding to FIG. 4. In some embodiments, as depicted in FIG. 8, the first position-determining surface 114 of an annular shape is formed inside the attachment hole 78, and the second position-determining surface 116 is formed on the drive shaft 24. The first position-determining surface 114 and the second position-determining surface 116 are positioned away from the distal end of the sleeve section 92. With this configuration, it is possible to provide the first position-determining surface 114 and the second position-determining surface 116 with simple configuration.

Figure 9:
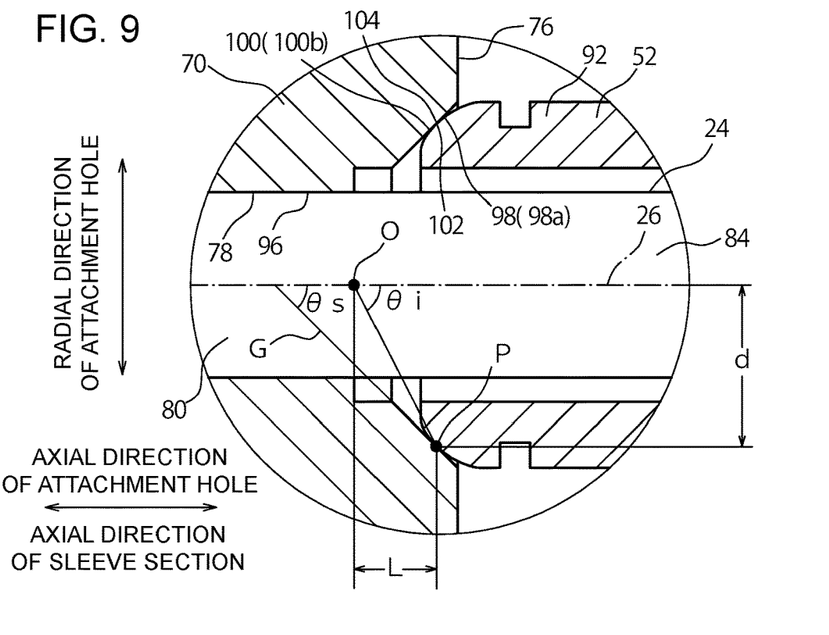
FIG. 9 is an enlarged view of a compressor according to some embodiments, corresponding to FIG. 4.

FIG. 9 is an enlarged view of the compressor 12 according to some embodiments, corresponding to FIG. 4.

In some embodiments, as depicted in FIG. 9, the diameter-widening surface 98 includes a female tapered surface 98a inclined constantly from the axis of the attachment hole 78, while the diameter-reducing surface 100 includes a curved surface 100b with varying inclination with respect to the axis of the attachment hole 78.

With this configuration, the diameter-widening surface 98 includes the female tapered surface 98a, the diameter-reducing surface 100 includes the curved surface 100b, and the sleeve-side contacting portion 104 includes a part of the curved surface 100b. Thus, it is possible to prevent a contact-surface pressure between the impeller-side contacting portion 102 and the sleeve-side contacting portion 104 from being locally high, which enables the impeller 20 to contract smoothly. Accordingly, local application of stress to the impeller 20 is prevented, and durability of the impeller 20 improves.

Figure 10:
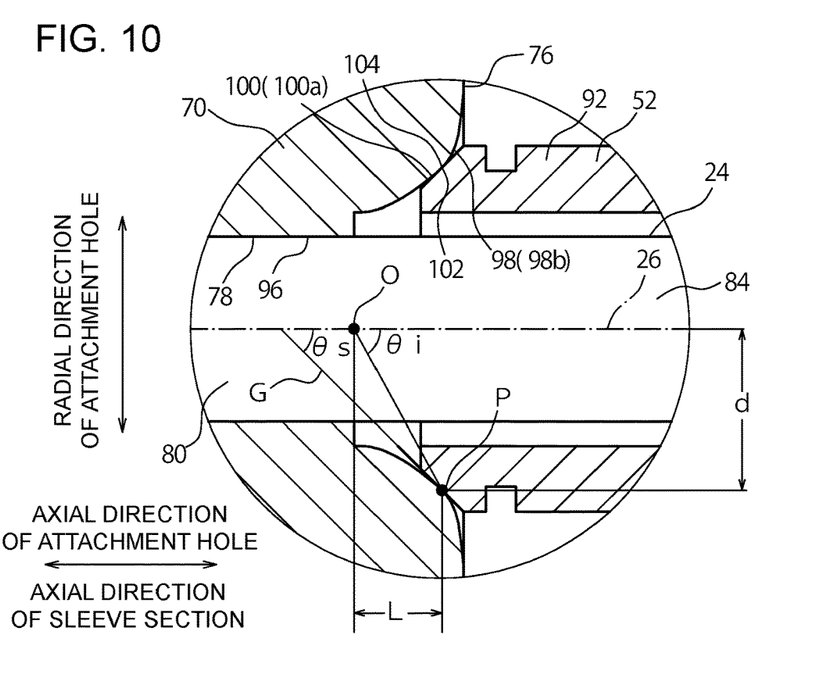
FIG. 10 is an enlarged view of a compressor according to some embodiments, corresponding to FIG. 4.

FIG. 10 is an enlarged view corresponding to FIG. 4 of the compressor 12 according to some embodiments.

In some embodiments, as depicted in FIG. 10, the diameter-widening surface 98 includes a curved surface 98b with varying inclination with respect to the axis of the attachment hole 78, while the diameter-reducing surface 100 includes a male tapered surface 100a with constant inclination with respect to the axis of the attachment hole 78.

With this configuration, the diameter-widening surface 98 includes the curved surface 98b, the diameter-reducing surface 100 includes the male tapered surface, and the impeller-side contacting portion 102 includes a part of the curved surface 98b. Thus, it is possible to prevent a contact-surface pressure between the impeller-side contacting portion 102 and the sleeve-side contacting portion 104 from being locally high, which enables the impeller 20 to contract smoothly. Accordingly, local application of stress to the impeller 20 is prevented, and durability of the impeller 20 improves.

In some embodiments, the sleeve inclination angle θs is at least 30°. If the sleeve inclination angle θs is 30° or more, a sufficient axial force can be applied from the impeller-side contacting portion 102 to the sleeve-side contacting portion 104 in a direction along the axis 26, i.e., in the axial direction of the drive shaft 24.

In some embodiments, a difference between arc tangent of d/L, i.e., the impeller inclination angle θi, and the sleeve inclination angle θs is 20° or less. If the difference between arc tangent of d/L and the sleeve inclination angle θs is 20° or less, when the back surface 76 side of the impeller 20 contracts, generation of an excessive contact pressure between the impeller-side contacting portion 102 and the sleeve-side contacting portion 104 is prevented. Accordingly, it is possible to prevent an excessive stress from being applied to the impeller 20 and the sleeve section 92.

In some embodiments, arc tangent of d/L, i.e., the impeller inclination angle θi is less than 90°.

In some embodiments, after the heating step S12, the fastening step S16 is performed before the temperature of the impeller 20 decreases to an ambient temperature.

With this configuration, it is possible to produce the compressor 12 in large volume by performing the fastening step S16 before the temperature of the impeller 20 decreases to an ambient temperature.

Embodiments of the present invention were described in detail above, but the present invention is not limited thereto, and various amendments and modifications may be implemented.

For instance, while the sleeve section 92 and the flange portion 90 of the thrust sleeve 52 are formed integrally in the above described embodiments, the sleeve section 92 and the flange portion 90 may be separate pieces. Further, a component constituting the sleeve section 92 is not limited to the thrust sleeve 52, and it is sufficient if the component is fitted to the drive shaft 24 and is in contact with the impeller 20, transmitting an axial force toward the stepped portion 86.

While the shaft section 80, the large-diameter section 82, and the middle section 84 are integrally formed in the above described embodiments, the shaft section 80 and the middle section 84 may be formed by a stud bolt or the like provided as a separate piece from the large-diameter section 82. Further, the stepped portion 86 may be formed by a snap ring or the like fitted onto the middle section 84.

While the fastening step S16 is performed before the temperature of the impeller 20 decreases to an ambient temperature in the above described embodiments, the method may further include a tightening step of tightening the fastening member 88 after the temperature of the impeller 20 decreases to an ambient temperature.

Further, the centrifugal compressor may be of variable displacement type.

DESCRIPTION OF REFERENCE NUMERAL

10 Turbine
12 Compressor
14 Turbine housing
16 Turbine blade
18 Compressor housing
20 Impeller
22 Bearing housing
24 Drive shaft
26 Axis
28 Cylindrical section
30 Scroll section
32 Throat portion
34 End wall
36 Seal portion
38 Seal ring
40 Back plate
42 Peripheral wall
44 Bearing section
46 Floating bush
48 Thrust member
50 Thrust collar
52 Thrust sleeve
54 Oil feed port
56 Oil drain port
58 Oil deflector
60 Lid member
62 Fixing ring
64 Cylindrical section
66 Scroll section
68 Diffuser section
70 Hub
72 Blade
72a Full blade
72b Splitter blade
74 Outer peripheral surface
76 Back surface
78 Attachment hole
80 Shaft section
82 Large-diameter section
84 Middle section
86 Stepped portion
88 Fastening member
90 Flange portion
92 Sleeve section
94 Thrust portion
96 Clamp surface
98 Diameter-widening surface
98a Female tapered surface
98b Curved surface
100 Diameter-reducing surface
100a Male tapered surface
100b Curved surface
102 Impeller-side contacting portion
104 Sleeve-side contacting portion
106, 110, 114 First position-determining surface
108, 112, 116 Second position-determining surface

The invention claimed is:

1. A centrifugal compressor, comprising:
a housing;
an impeller disposed rotatably inside the housing and comprising a hub with an attachment hole and a plurality of blades integrally provided with the hub;
a drive shaft comprising a shaft section extending inside the attachment hole of the impeller, a stepped section separated from the impeller, and a middle section disposed between the shaft section and the stepped section;
a fastening member screwed to a distal end side of the shaft section;
at least one flange portion fitted onto the middle section;
a thrust member fixedly disposed relative to the housing and comprising a through hole through which the drive shaft is inserted and a thrust section which is disposed around the through hole and which contacts the flange portion; and
a sleeve section fitted onto the middle section and disposed between the flange portion and the impeller,
wherein an inner peripheral surface of the attachment hole comprises a clamp surface which is in close contact with the shaft section by shrink fitting, and a diameter-widening surface with an inner diameter which increases with a distance from the clamp surface in an axial direction of the attachment hole,
wherein an outer peripheral surface of the sleeve section comprises a diameter-reducing surface with an outer diameter which reduces toward the clamp surface in the axial direction of the attachment hole,
wherein the diameter-widening surface and the diameter-reducing surface respectively comprise an impeller-side contacting portion and a sleeve-side contacting portion which contact each other, and
wherein a relationship represented by an expression $\theta s < \mathrm{atan}(d/L)$ is satisfied, where
d is a length from an axis of the attachment hole to the sleeve-side contacting portion in a radial direction of the attachment hole,
L is a length from the sleeve-side contacting portion to the clamp surface in the axial direction of the attachment hole, and
$\theta s$ is a sleeve inclination angle formed by an intersection of an axis of the sleeve section and a generatrix of a virtual cone which contacts the diameter-reducing surface at the sleeve-side contacting portion.

2. The centrifugal compressor according to claim 1, wherein the impeller comprises a first position-determining surface which is substantially orthogonal to the axis of the attachment hole, and
wherein one of the sleeve section or the drive shaft comprises a second position-determining surface which is substantially orthogonal to the axis of the attachment hole and which is contactable with the first position-determining surface during the shrink fitting.

3. The centrifugal compressor according to claim 1, wherein the sleeve inclination angle $\theta s$ is 30° or more.

4. The centrifugal compressor according to claim 1, wherein a difference between the atan (d/L) and the sleeve inclination angle $\theta s$ is 20° or less.

5. The centrifugal compressor according to claim 1,
wherein the diameter-widening surface comprises a female tapered surface having constant inclination with respect to the axis of the attachment hole, and
wherein the diameter-reducing surface comprises a male tapered surface having constant inclination with respect to the axis of the attachment hole.

6. The centrifugal compressor according to claim 1,
wherein the diameter-widening surface comprises a female tapered surface having constant inclination with respect to the axis of the attachment hole, and
wherein the diameter-reducing surface comprises a curved surface having varying inclination with respect to the axis of the attachment hole.

7. The centrifugal compressor according to claim 1,
wherein the diameter-widening surface comprises a curved surface having varying inclination with respect to the axis of the attachment hole, and
wherein the diameter-reducing surface comprises a male tapered surface having constant inclination with respect to the axis of the attachment hole.

8. A turbocharger, comprising:
the centrifugal compressor according to claim 1; and
a turbine comprising a turbine blade fixed to the drive shaft.

9. A method of producing a centrifugal compressor which comprises:
a housing;
an impeller disposed rotatably inside the housing and comprising a hub with an attachment hole and a plurality of blades integrally provided with the hub;
a drive shaft comprising a shaft section extending inside the attachment hole of the impeller, a stepped section separated from the impeller, and a middle section disposed between the shaft section and the stepped section;
a fastening member screwed to a distal end side of the shaft section;
at least one flange portion fitted onto the middle section;
a thrust member fixedly disposed relative to the housing and comprising a through hole through which the drive shaft is inserted and a thrust section which is disposed around the through hole and which contacts the flange portion; and
a sleeve section fitted onto the middle section and disposed between the flange portion and the impeller,
wherein an inner peripheral surface of the attachment hole comprises a clamp surface which is in close contact with the shaft section by shrink fitting, and a diameter-widening surface with an inner diameter which increases with a distance from the clamp surface in an axial direction of the attachment hole,
wherein an outer peripheral surface of the sleeve section comprises a diameter-reducing surface with an outer diameter which reduces toward the clamp surface in the axial direction of the attachment hole,
wherein the diameter-widening surface and the diameter-reducing surface respectively comprise an impeller-side contacting portion and a sleeve-side contacting portion which contact each other, and
wherein a relationship represented by an expression $\theta s < \operatorname{atan}(d/L)$ is satisfied, where
d is a length from an axis of the attachment hole to the sleeve-side contacting portion in a radial direction of the attachment hole,
L is a length from the sleeve-side contacting portion to the clamp surface in the axial direction of the attachment hole, and
$\theta s$ is a sleeve inclination angle formed by an intersection of an axis of the sleeve section and a generatrix of a virtual cone which contacts the diameter-reducing surface at the sleeve-side contacting portion, the method comprising:
a first inserting step of inserting the drive shaft into the through hole of the thrust member, the flange portion, and the sleeve section;
a heating step of heating the impeller;
a second inserting step of inserting the shaft section into the attachment hole of the impeller heated in the heating step, after the first inserting step; and
a fastening step of screwing a fastening member to a distal end side of the shaft section, after the second inserting step.

10. The method of producing a centrifugal compressor according to claim 9,
wherein the impeller comprises a first position-determining surface which is substantially orthogonal to the axis of the attachment hole,
wherein one of the sleeve section or the drive shaft comprises a second position-determining surface which is substantially orthogonal to an axis of the drive shaft, and
wherein the second inserting step comprises making the second position-determining surface contact the first position-determining surface.

11. The method of producing a centrifugal compressor according to claim 9,
wherein the fastening step is performed after the heating step and before a temperature of the impeller decreases to an ambient temperature.

* * * * *